United States Patent
Kubo et al.

(10) Patent No.: US 10,140,490 B2
(45) Date of Patent: Nov. 27, 2018

(54) MODULE FOR OPTICAL INFORMATION READER

(71) Applicant: OPTOELECTRONICS CO., LTD., Warabi-shi, Saitama (JP)

(72) Inventors: Wataru Kubo, Warabi (JP); Satoshi Komi, Warabi (JP)

(73) Assignee: OPTOELECTRONICS CO., LTD., Warabi-shi (JP)

( * ) Notice: Subject to any disclaimer, the term of this patent is extended or adjusted under 35 U.S.C. 154(b) by 0 days.

(21) Appl. No.: 15/049,691

(22) Filed: Feb. 22, 2016

(65) Prior Publication Data

US 2016/0253536 A1   Sep. 1, 2016

Related U.S. Application Data

(60) Provisional application No. 62/121,312, filed on Feb. 26, 2015.

(30) Foreign Application Priority Data

Oct. 6, 2015   (JP) .................................. 2015-198590

(51) Int. Cl.
  *G06K 7/10*   (2006.01)
  *G02B 26/10*  (2006.01)
  (Continued)

(52) U.S. Cl.
  CPC ......... *G06K 7/10831* (2013.01); *G02B 7/025* (2013.01); *G02B 7/04* (2013.01);
  (Continued)

(58) Field of Classification Search
  CPC ...... G02B 26/105; G02B 7/023; G02B 7/025; G02B 27/30; G02B 27/62; G06K 7/1098; G06K 7/10831
  See application file for complete search history.

(56) References Cited

U.S. PATENT DOCUMENTS 4,918,702 A * 4/1990 Kimura ................ G02B 6/4204
                                                    372/101
5,490,158 A * 2/1996 Mogi ....................... B41J 2/471
                                                    372/36
(Continued)

FOREIGN PATENT DOCUMENTS

JP         05022530 A  *  1/1993
JP      2000028888 A  *  1/2000
(Continued)

OTHER PUBLICATIONS

English Translation of JP2010117510; retrieved Jan. 23, 2017.*
(Continued)

*Primary Examiner* — Christopher Stanford
(74) *Attorney, Agent, or Firm* — Westerman, Hattori, Daniels & Adrian, LLP

(57) ABSTRACT

A collimator lens unit in which an aperture limit stop formation member and a collimator lens are integrally disposed in a cylindrical member is inserted in a lens-barrel hole of the module casing so as to be reciprocatable in an optical axis direction, and a light-emitting unit is fixed in the lens-barrel hole, with an optical axis of a light source aligned with an optical axis of the collimator lens. A long hole through which an adjust pin is penetrated so as to be reciprocatable in the optical axis direction is formed in a peripheral sidewall of the lens-barrel hole, and a fitting portion in which the adjust pin is fit is formed in an outer peripheral surface of the cylindrical member. On an inner peripheral surface of the lens-barrel hole, at a position opposed to the fitting portion, bearing portions in contact with the outer peripheral surface of the cylindrical member are formed.

8 Claims, 6 Drawing Sheets

(51) Int. Cl.
*G02B 27/30* (2006.01)
*G02B 7/04* (2006.01)
*G02B 7/02* (2006.01)

(52) U.S. Cl.
CPC .......... *G02B 26/105* (2013.01); *G02B 27/30* (2013.01); *G06K 7/1098* (2013.01)

(56) References Cited

U.S. PATENT DOCUMENTS

| | | | |
|---|---|---|---|
| 6,178,016 B1* | 1/2001 | Ashe | H04N 1/03 358/487 |
| 6,410,904 B1 | 6/2002 | Ito et al. | |
| 6,661,588 B1* | 12/2003 | Huang | G02B 7/026 359/819 |
| 7,206,109 B2 | 4/2007 | Hayakawa et al. | |
| 2004/0109243 A1* | 6/2004 | Orimo | G02B 7/023 359/819 |
| 2005/0040324 A1* | 2/2005 | Kobayashi | G02B 7/025 250/234 |
| 2006/0204234 A1* | 9/2006 | Kawai | G02B 7/10 396/72 |
| 2007/0047110 A1* | 3/2007 | Matsushima | G02B 7/025 359/819 |
| 2011/0013901 A1* | 1/2011 | Utsugi | G02B 7/026 396/529 |

FOREIGN PATENT DOCUMENTS

| | | | |
|---|---|---|---|
| JP | 2001-215425 A | | 8/2001 |
| JP | 2003-76942 A | | 3/2003 |
| JP | 2006138914 A | * | 6/2006 |
| JP | 2010-117510 A | | 5/2010 |
| WO | 03/019463 A1 | | 3/2003 |

OTHER PUBLICATIONS

Certificate of Patent dated May 27, 2016, issued in counterpart Japanese Patent Application No. 2015-198590. (1 page).
English translation of Notification of Reasons for Refusal dated Feb. 23, 2016, issued in counterpart Japanese Patent Application No. 2015-198590 (3 pages).
Office Action dated Feb. 23, 2016, issued in counterpart Japanese Patent Application No. 2015-198590. (3 pages).

* cited by examiner

[Fig. 1]
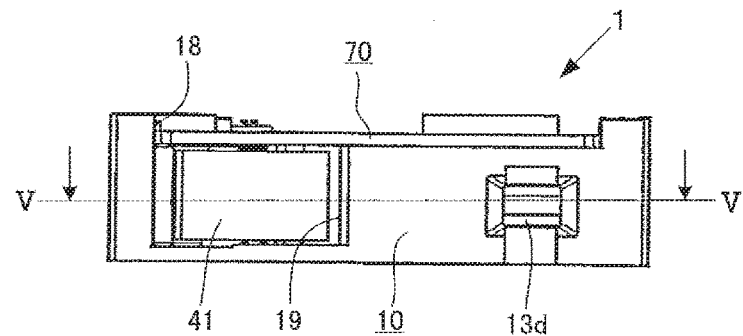
[Fig. 2]
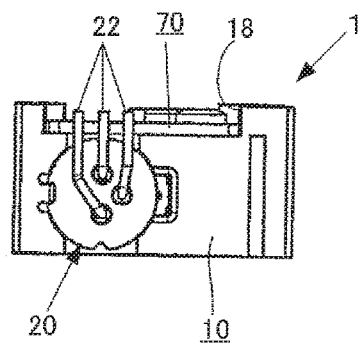
[Fig. 3]
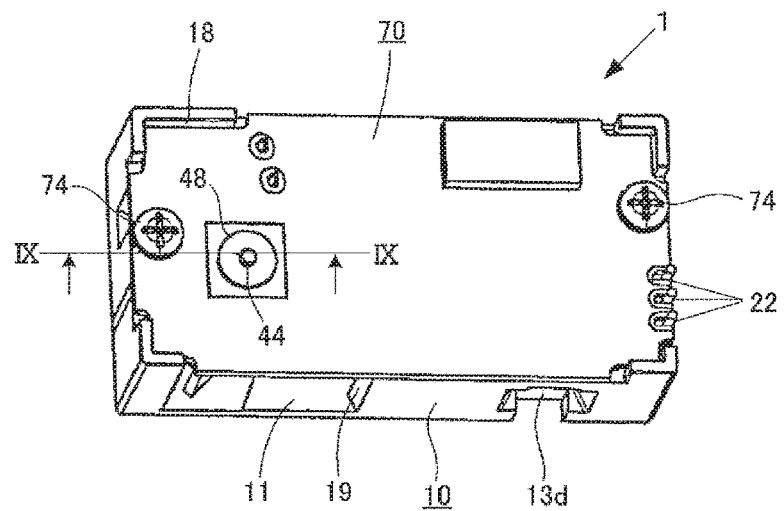

[Fig. 4]
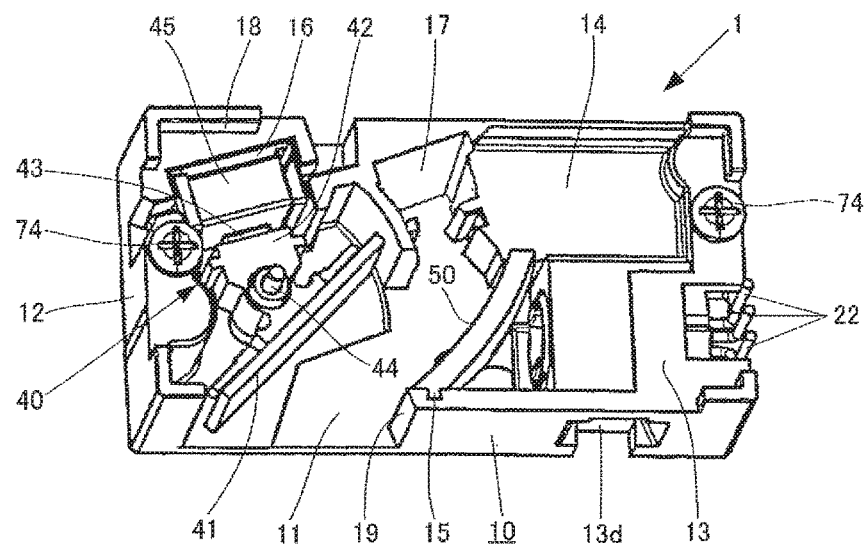
[Fig. 5]
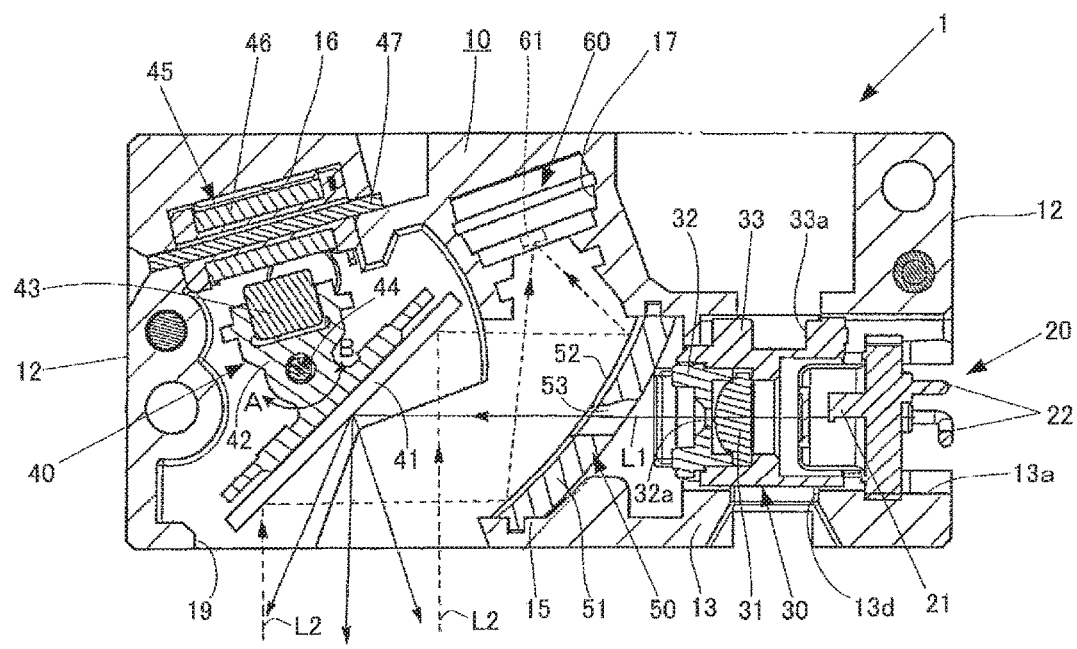

[Fig. 6]
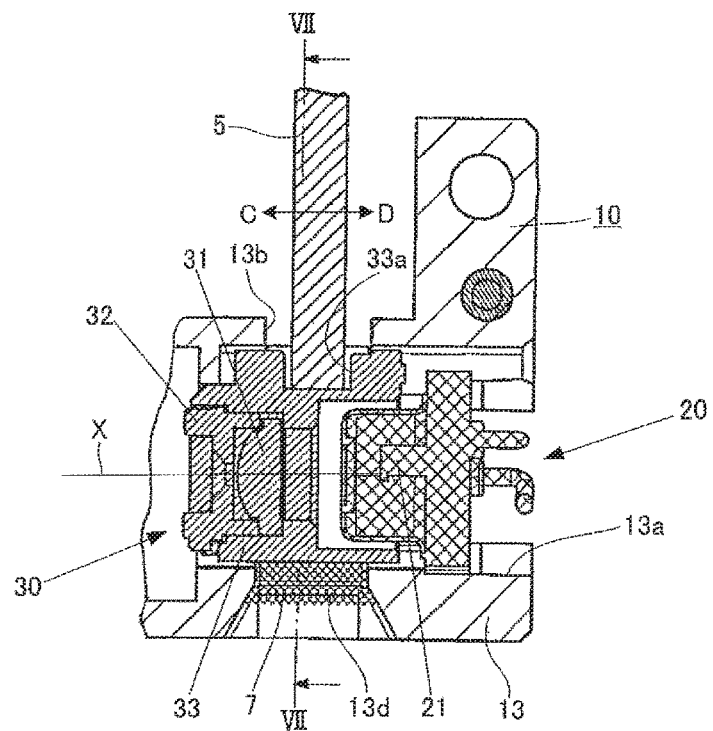
[Fig. 7]
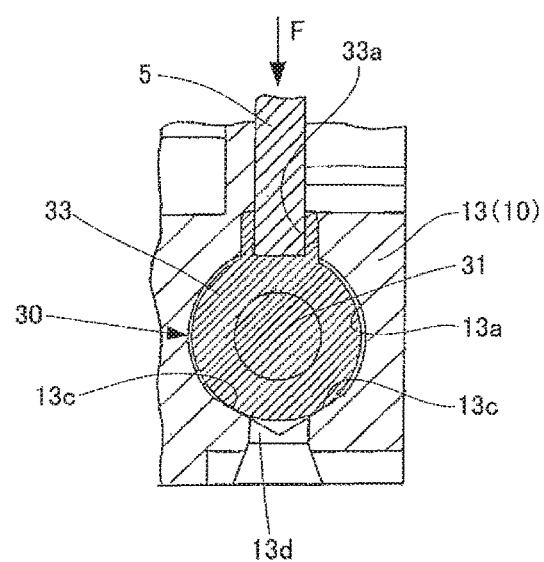

[Fig. 8A]
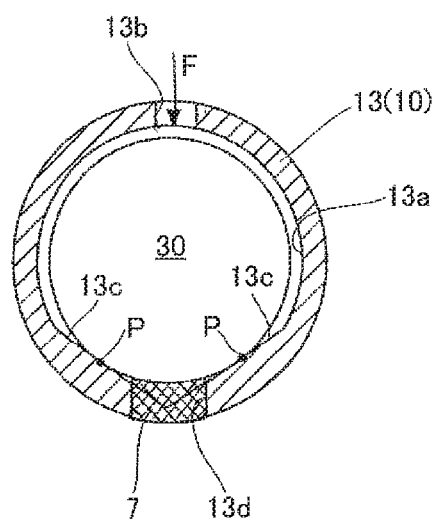
[Fig. 8B]
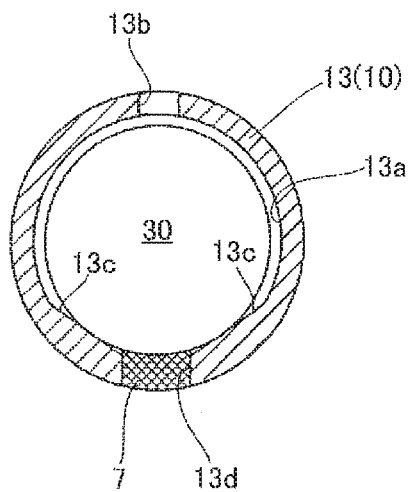

[Fig. 9]
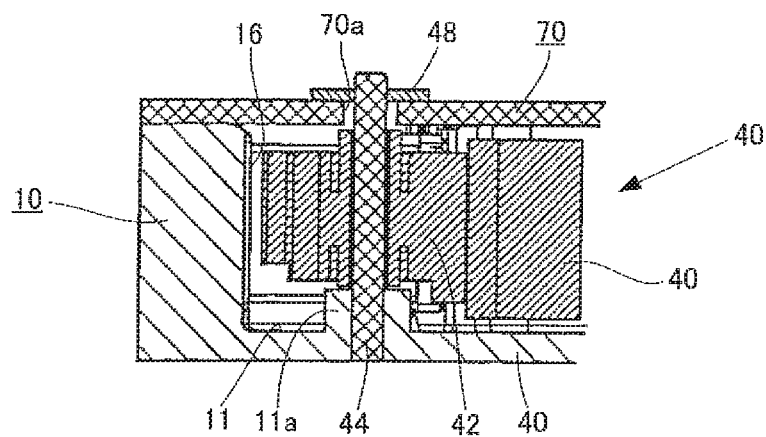
[Fig. 10]
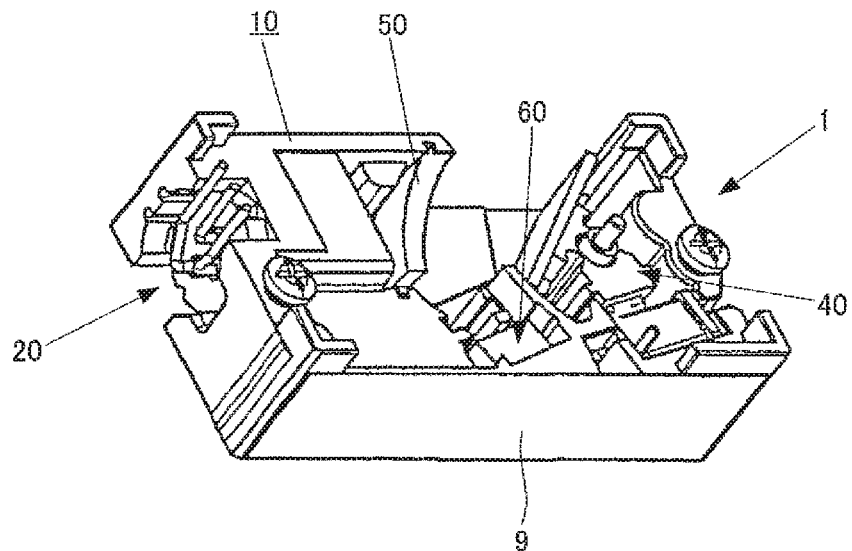

[Fig. 11A]
PRIOR ART
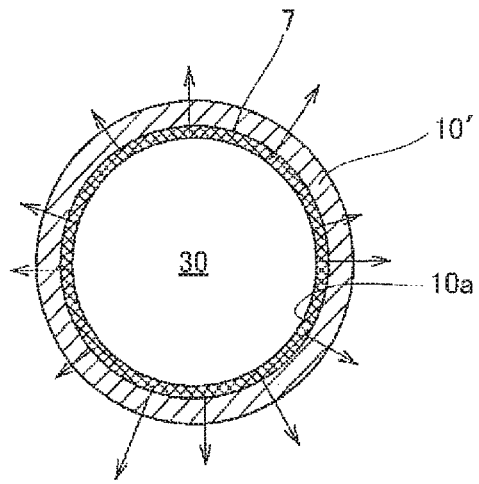
[Fig. 11B]
PRIOR ART
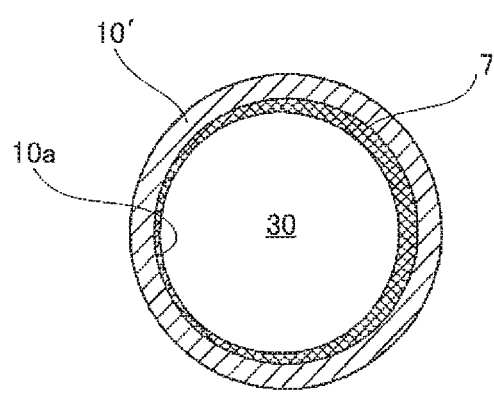

MODULE FOR OPTICAL INFORMATION READER

FIELD OF THE INVENTION

The invention relates to a module installed in an optical information reader for reading optical information of a bar code and the like.

BACKGROUND OF THE INVENTION

As an optical information reader, bar code readers which read optical information of bar codes, two-dimensional codes, and the like indicating information such as names and prices of products are used widely by the distribution industry and the retail industry.

The bar code readers are roughly classified into hand-held ones held by one hand when in use and stationary ones, and the hand-held ones further include a pen type, a touch type, and a light beam scanning type (laser type). Among these, an optical information reader being an object of the invention. is an optical information reader such as a hand-held bar code reader of the light beam scanning type.

A bar code reader of the light beam scanning type shapes light emitted by a light source such as a laser diode (semi-conductor laser) into a beam, deflects the light beam by a mirror so that the light beam hits on a bar code, and while rotating or vibrating (swinging) the mirror, scans the bar code so that the light beam moves across the bar code.

Then, the reflected light from the bar code is condensed, is received by a light-receiving sensor, and is converted to an electrical signal. The electrical signal is coded after A/D conversion and the resultant is output as bar code read information. In the hand-held optical information reader of the light beam scanning type, its read engine part is required to be greatly reduced in size and weight.

Under such circumstances, there has come into use a module for an optical information reader in which the aforesaid light source, a collimator lens for shaping the light emitted by the light source into a beam, a vibration mirror and it's driver, a collector mirror or a condenser lens, a light-receiving sensor, a processing circuit for a detection signal of the light-receiving sensor, and so on are assembled in a common easing to be modularized, as described in, for example, PLT 1, 2, 3, and so on.

In such a module for an optical information reader, a light-emitting unit whose light source is, for example, a laser diode, the collimator lens for turning the light emitted by the light source into a parallel luminous flux, and a member having an aperture through which the parallel luminous flux exits as a thin beam need to be fixedly positioned in a lens barrel, with their optical axes aligned. Further, in order for the collimator lens to surely generate the light beam which is to be converged in the parallel light flux or at a finite distance, it is necessary to accurately adjust the distance between the light-emitting unit and the collimator lens (collimation adjustment or focus adjustment) so that a focal point of the collimator lens and a light-emitting point of the light-emitting unit have a predetermined positional relation.

Therefore, in a light beam generating part in the module for the optical information reader disclosed in the aforesaid PLT 1, 2, 3, in part of the module casing, a lens-barrel hole is provided, at whose leading end portion the aperture being an aperture limit stop for letting the light beam exit therethrough is formed and whose rear end portion is opened to be formed as a press-fitting portion where to press-fit the light-emitting unit. Then, the collimator lens is bonded and fixed at a position short of the aperture, at a leading end rear side portion of the lens-barrel hole, and the light-emitting unit is pressed into the press-fitting portion from the rear end portion, whereby they are positioned.

CITATION LIST

Patent Literature

{PTL 1} U.S. Pat. No. 7,206,109 B2
{PTL 2} WO 03/019463 A1
{PTL 3} JP 2003-76942 A

SUMMARY OF INVENTION

Technical Problem

Such a conventional module for an optical information reader had the following problems.

Since the light-emitting unit is pushed into the lens-barrel hole while being pressed, and for the collimation adjustment, it is moved in one direction (a direction which is an optical axis direction and in which it approaches the collimator lens), re-adjustment by returning it was not possible. Accordingly, when the light-emitting unit is pushed too much, this module becomes a defective product, resulting in worsened production yields.

Further, delicate adjustment on a micron level was not possible since the light-emitting unit is press-fit and thus frictional resistance is high, and there is a possibility that the collimator lens and the laser diode are tilted relatively to each other.

Object of the Invention

The invention was made in consideration of the above technical background, and has an object to make it possible to, in a module for an optical information reader, easily and delicately make collimation adjustment and focus adjustment in both directions of back and forth directions along an optical axis while preventing a collimator lens and a laser diode from being tilted relatively to each other, thereby greatly reducing the occurrence of defective products to enhance production yields.

Solution to Problem

A module for an optical information reader according to the invention is a module for an optical information reader in which a light-emitting unit having a light source such as a laser diode, a collimator lens, a vibration mirror for scanning, a collector mirror or a condenser lens, and a light-receiving sensor are disposed in a module casing to be modularized, and it is structured as follows in order to achieve the aforesaid object.

A collimator lens unit in which an aperture limit stop formation member and the collimator lens are integrally disposed in a cylindrical member is inserted in a lens-barrel hole of the module casing so as to be reciprocatable in an optical axis direction within a predetermined range, and the light-emitting unit is fixed to the module easing in the lens-barrel hole, with an optical axis of the light source aligned with an optical axis of the collimator lens.

Further, a long hole through which an adjust pin is penetrated so as to be reciprocatable in the optical axis direction within a predetermined range is formed in a peripheral sidewall of the lens-barrel hole of the module casing, and a fitting portion in which a tip portion of the adjust pin penetrating through the long hole is fit is formed in an outer peripheral surface of the cylindrical member.

Furthermore, on an inner peripheral surface of the lens-barrel hole of the module casing, at or near a position opposed to the fitting portion, bearing portions in contact with the outer peripheral surface of the cylindrical member are formed at positions symmetrical with respect to the position in terms of an inner circumferential direction of the lens-barrel hole.

Preferably, the bearing portions form a V-shaped slope by two flat surfaces which, in a circumferential direction, are in point contact with the outer peripheral surface of the cylindrical member, and in an axial direction, are in line contact with the outer peripheral surface.

Preferably, an open-hole through which an adhesive for fixing the cylindrical member is tillable is formed in a middle region, of the V-shaped slope, which is not in contact with the outer peripheral surface of the cylindrical member.

The collimator lens unit may be structured such that the collimator lens and the aperture limit stop formation member are fixed to the cylindrical member.

The collimator lens unit may be structured such that the aperture limit stop formation member and the cylindrical member are integrally disposed on the collimator lens itself.

The collimator lens unit may be structured such that the collimator lens and the cylindrical member are integrally formed of the same material or different kinds of materials, and to the resultant formed body, the aperture limit stop formation member is fixed.

The module casing may be formed of resin. Desirably, the resin is reinforced resin in which carbon is dispersed.

Desirably, a metallic foil is affixed on an outer wall surface of the module casing made of the resin, at least near a portion where the light-receiving sensor is housed.

Advantageous Effects of Invention

In the module for the optical information reader according to the invention, the module casing is fixed to a jig, the tip portion of the adjust pin is passed through the long hole of the module casing to be inserted into the lens-barrel hole and is fit in the fitting portion of the cylindrical member or the cylindrical part of the collimator lens unit, and when the adjust pin is moved in the optical axis direction of the collimator lens by a linear movement mechanism of the jig, it is possible to move the collimator lens integrally with the cylindrical member or the cylindrical part to easily make collimation adjustment.

Further, the adjustment can be made while the collimator lens is moved in the both directions of the optical axis direction, that is, directions in which it approaches and separates from the light source, and therefore, if it is moved too much in one of the directions, the re-adjustment is possible by returning it. This can greatly reduce the occurrence of defective products to enhance production yields. Setting a movement pitch of the adjust pin fine can facilitate, even delicate and highly accurate adjustment.

Since it is possible for the adjust pin to move the cylindrical member or the cylindrical part of the collimator lens unit while pressing it against the bearing portions on the opposite side, the adjustment can be made without any deviation of the optical axis. Further, by reducing a contact area between the outer peripheral surface of the cylindrical member or the cylindrical part and the bearing portions, it is possible to move the cylindrical member or the cylindrical part smoothly with a relatively small force.

If the open-hole from which the adhesive can be filled is formed near the bearing portions, it is possible to fill the adhesive from the opening to fixedly bond the cylindrical member or the cylindrical part to the module casing after the collimation adjustment while pressing the cylindrical member or the cylindrical part against the bearing portions by the adjust pin, and thus adjustment deviation and optical axis deviation of the collimator lens are not liable to occur.

Forming the module casing of the resin having the heat dissipation property and the shielding property makes it possible to reduce weight as well as to reduce cost far more than forming it of metal. In addition, the heat dissipation property and the shielding property to a degree not practically problematic can also be obtained. Using the black resin such as the reinforced resin in which carbon is dispersed makes it possible to prevent the reflection of the light. If the shielding effect is not sufficient, by affixing the metallic foil on a necessary portion of the outer wall surface of the module casing, it is possible to enhance the shielding effect.

BRIEF DESCRIPTION OF DRAWINGS

FIG. 1 is a front view of one embodiment of a module for an optical information reader according to the invention.

FIG. 2 is a right side view of the module for the optical information reader according to the same.

FIG. 3 is a perspective view of the module for the optical information reader according to the same seen from obliquely above.

FIG. 4 is a perspective view of the module for the optical information reader according to the same seen from the same direction as that in FIG. 3, with a circuit board removed.

FIG. 5 is an enlarged sectional view taken along V-V line in FIG. 1.

FIG. 6 is an enlarged partial sectional view illustrating a light beam generating part in FIG. 5 together with an adjust pin.

FIG. 7 is a partial sectional view taken along VII-VII line in FIG. 6.

FIG. 8A is a sectional view schematically illustrating a cross section similar to that in FIG. 7 to explain characteristics of collimation adjustment according to an embodiment of the invention.

FIG. 8B is a sectional view illustrating the same in a state after an adhesive for fixing a collimator lens unit to a module casing is cured.

FIG. 9 is a sectional view taken along IX-IX line in FIG. 3.

FIG. 10 is a perspective view illustrating an embodiment in which a metallic foil is affixed on an outer wall surface of the module casing to enhance a shielding effect, with the circuit board removed.

FIG. 11A is a sectional view illustrating a bonding example being a reference example for comparison with the embodiment of the invention, which corresponds to FIG. 8A before the adhesive is cured.

FIG. 11B is a sectional view illustrating the same, which corresponds to FIG. 8B after the adhesive is cured.

DETAILED DESCRIPTION

Hereinafter, modes for carrying out the invention will be described based on the drawings.

First, the entire structure of one embodiment of a module for an optical information reader according to the invention will be specifically described with reference to FIG. 1 to FIG. 5.

FIG. 1 is a front view of the module for the optical information reader and FIG. 2 is a right side view thereof FIG. 3 is a perspective view of the module for the optical information reader seen from obliquely above, and FIG. 4 is a perspective view of the same seen from the same direction, with a circuit board removed. FIG. 5 is an enlarged sectional view taken along V-V line in FIG. 1.

This module 1 for the optical information reader is a read engine installed in an optical information reader such as a bar code reader, and as illustrated in these drawings, it is composed of a module casing 10; a light-emitting unit 20, a collimator lens unit 30, a vibration mirror driver 40, a collector mirror 50 having a concave surface shape, and a light-receiving sensor 60 which are assembled in the module casing 10; a circuit board 70 attached to an upper surface of the module casing 10; and so on.

The module casing 10 has, for example, a size of 14 mm depth (D) 28 mm width (W), and 7.5 mm height (H) as its whole outer shape, but this is not restrictive. Since such a module casing is required to have a heat dissipation property and a shielding property, it has been conventionally formed by a die casting manufacturing method by using metal such as, for example, zinc called ZDC2 or a magnesium alloy called AZ91D. The module casing of the module for the optical information reader according to the invention may similarly be formed of metal by the die casting manufacturing method.

However, the module casing 10 in this embodiment is formed of resin higher in heat dissipation property (thermal conductivity) and shielding property (electric conductivity) than ordinary resin, for example, formed of black reinforced resin in which carbon is dispersed. As a specific example of the resin material, TCF1140 manufactured by Mitsubishi Engineering-Plastics Corporation is preferably used. Forming the module casing 10 of such resin can achieve a cost reduction and a great weight reduction, and to obtain a heat dissipation property and a shielding property high enough for practical application.

Further, this module casing 10 has a bottom surface portion 11, a sidewall portion 12 surrounding its periphery, a light beam generating part housing part 13, a LSI housing recessed part 14, a collector mirror attachment part 15, a vibration mirror driver attachment part 16, a light-receiving unit attachment part 17, a circuit board holding part 18, and so on.

On the bottom surface portion 11 of the vibration mirror driver attachment part 16, a boss 11a (refer to FIG. 9) is formed, and a lower end portion of a support shaft 44 of a vibration mirror 41 is fit therein to be supported. A front face, of the sidewall portion 12, corresponding to the vibration mirror driver attachment part 16 is opened to form an opening 19 for letting a light beam exit and incident.

As illustrated in FIG. 5, the light-emitting unit 20 and the collimator lens unit 30 which form a light beam generating part are disposed in a lens-barrel hole 13a which is formed in the light beam generating part housing part 13 of the module casing 10 and which has a cylindrical inner peripheral surface.

The light-emitting unit 20 has a laser diode 21 as a light source, and is inserted to be fixed in the lens-barrel hole 13a from an opening of the sidewall portion 12 of the module casing 10 on the right side in FIG. 5. As illustrated in FIG. 2 and so on, three terminals 22 of the laser diode 21 project to extend upward from a rear end surface of the light-emitting unit 20 and are connected to terminals of the board 70 side.

In the collimator lens unit 30, a collimator lens 31 and an aperture limit stop formation member 32 in which an aperture 32a being an aperture limit stop is formed are integrally fixed in a cylindrical member 33 being a collimator lens barrel. The aperture limit stop formation member 32 is fixed to a front end portion of the cylindrical member 33 by an adhesive or the like, presses the collimator lens 31 against an inner periphery stepped portion of the cylindrical member 33 to fix it, and has the aperture 32a disposed just in front of the collimator lens 31.

This collimator lens unit 30 is inserted in the lens-barrel hole 13a of the light beam generating part housing part 13 of the module casing 10 so as to be reciprocatable in an optical axis direction within a predetermined range. The aperture limit stop formation member 32 and the cylindrical member 33 can be formed of the same material as or has performance equivalent to that of the module casing 10 (polycarbonate containing 20% glass, aluminum, or the like). The light-emitting unit 20 is fixed to the module casing 10 in the lens-barrel hole 13a so as to partly enter the inside of the cylindrical member 33, with an optical axis of the light source being aligned with an optical axis of the collimator lens 31. Details of the collimator lens unit 30 and collimation adjustment will be described later.

As illustrated in FIG. 4 and FIG. 5, the vibration mirror driver 40 is composed of: a vibration mirror 41 for light beam scanning made of metal, resin, or glass; a vibration mirror holding member 42 fixed to a front surface portion of the vibration mirror 41 and made of resin; a movable magnet (permanent magnet) 43 fixed to a rear surface side of the vibration mirror holding member 42; the support shaft 44 in a pin shape supporting the vibration mirror holding member 42 so as to allow its rotation; and a coil unit 45 disposed to face and to be apart from and in parallel to the movable magnet 43. In the coil unit 45, a yoke 47 penetrates through a coil 46 in a direction perpendicular to a winding direction of the coil 46.

These are attached to the vibration mirror driver attachment part 16 of the module casing 10. Then, by an action of the movable magnet 43 and the coil unit 45, the vibration mirror holding member 42 and the vibration mirror 41 fixed thereto are vibrated (swung) in a seesaw manner as indicated by the arrows A, B in FIG. 5.

A collector mirror 50 having a concave surface shape is fixed in a tilting manner to the collector mirror attachment part 15 of the module casing 10 so as to face the vibration mirror 41 and the light-receiving sensor 60. The collector mirror 50 has a reflective film 52 formed on a concave curved surface of a curved substrate 51 made of resin, and has a rectangular or circular through hole 53 formed at its center portion to allow the light beam to pass therethrough.

The light-receiving sensor 60 has a light-receiving element 61 such as a photodiode (PD), and is integrated with the circuit board 70 with its two terminals connected to the circuit board 70 illustrated in FIG. 3. Accordingly, when the circuit board 70 is mounted on the circuit board holding part 18 of the module casing 10, the light-receiving sensor 60 is inserted to the light-receiving sensor attachment part 17 to be disposed at a predetermined position.

On the circuit board 70, a not-illustrated necessary wiring pattern is formed and various kinds of chip-shaped electronic components are attached, and on its rear surface side, a LSI (large-scale integrated circuit) playing a central role in signal processing and control is mounted.

Then, this circuit board 70 is fixedly attached to the upper surface of the module casing 10 with a plurality of screws 74, and serves also as an upper cover of this module 1 for the optical information reader. At this time, the LSI mounted on the rear surface is housed in the LSI housing recessed part 14 (FIG. 4) of the module casing 10. The LSI is prevented from being influenced by electromagnetic wave noise generated by other electronic devices, cellular phones, and so on since four surfaces of its outer periphery are surrounded by the resin with a high shielding property of the module casing 10.

Functions of the module 1 for the optical information reader thus structured will be described by mainly using FIG. 5.

A laser ray is generated as a result of the light emission of the laser diode 21 being the light source in the light-emitting unit 22, this is turned into a luminous flux which is parallel or is converged at a desired distance by the collimator lens 31, and the luminous flux is passed through the aperture 32a to be radiated as a laser beam L1 indicated by the solid line.

This laser beam L1 passes through the through hole 53 of the collector mirror 50 to reach the vibration mirror 41, is reflected in a predetermined angular range whose center is 90°, due to the vibration of the vibration mirror 41, and exits from the opening 19 to the outside. This laser beam irradiates a not-illustrated bar code symbol.

The bar code symbol has a plurality of black and white vertical stripes each having a predetermined width stipulated by the standard as is well known. They are called black bars and spaces. Light with different reflectance is reflected depending on a lateral width of each of the black bars and the spaces.

Rays L2 (indicated by the broken-line arrows in FIG. 5) reflected from the bar code symbol pass through the opening 19 again and enter the vibration mirror 41 to be reflected. Their reflected lights are collected by the collector mirror 50. At this time, since the vibration mirror 41 vibrates due to a magnetic force generated between the coil unit 45 and the movable magnet 43, it is possible for the lights in a wide range reflected from the bar code symbol to enter and to be sent to the collector mirror 50. Then, the lights collected by the collector mirror 50 are all received by the light-emitting element 61 of the light-receiving sensor 60.

The light-receiving sensor 60 outputs an electrical signal according to the intensity of the light received by the light-receiving element 61 and sends the electrical signal to the circuit board 70. In the circuit board 70, the electrical signal is A/D converted and thereafter the digital signal is processed, whereby data read from the bar code symbol is obtained.

By assembling this module 1 for the optical information reader in a not-illustrated case together with a power supply part and so on, it is possible to easily complete a compact optical information reader such as a hand-held bar code reader.

Next, a characterizing structure in the light beam generating part of this module 1 for the optical information reader, a method of the collimation adjustment (also called focus adjustment), and a fixing method of the collimator lens unit 30 and the module casing 10 after this adjustment will be described based on FIG. 6, FIG. 7, FIG. 8A, and FIG. 8B.

FIG. 6 is an enlarged partial sectional view illustrating the light beam generating part in FIG. 5 together with the adjust pin, and FIG. 7 is a partial sectional view taken along VII-VII line in FIG. 6. In these drawings, the light-emitting unit 20 is entirely cross-hatched in the same manner, and the collimator lens unit 30 is also entirely hatched in the same manner.

FIG. 8A is a sectional view schematically illustrating a cross section similar to that in FIG. 7 to explain characteristics of the collimation adjustment according to the embodiment of the invention, and FIG. 8B is a sectional view illustrating a state after the adhesive for fixing this collimator lens unit 30 to the module casing is cured. In these drawings, the hatching of the collimator lens unit 30 is omitted.

As previously described, the collimator lens unit 30 has the collimator lens 31 and the aperture limit stop formation member 32 integrally fixed in the cylindrical member 33, and is inserted in the lens-barrel hole 13a of the light beam generating part housing part 13 of the module casing 10 so as to be reciprocatable in the direction along the optical axis X within the predetermined range. Thus, an outside diameter of the cylindrical member 33 is slightly smaller than an inside diameter of the lens-barrel hole 13a and there exists a small gap between the both.

In a peripheral sidewall of the lens-barrel hole 13a in the light beam generating part housing part 113 of the module casing 10, a long hole 131) through which the adjust pin 5 penetrates so as to be reciprocatable in the optical axis direction (C and D directions indicated by the arrows in FIG. 6) within a predetermined range is formed. Further, in an outer periphery of the cylindrical member 33 of the collimator lens unit 30, a fitting portion 33a in which a tip portion of the adjust pin 5 penetrating through the long hole 13b is fit is formed. The fitting portion 33a is a recessed portion in this embodiment, but if a recessed portion is formed in a tip surface of the adjust pin 5, the fitting portion of the outer periphery of the cylindrical member 33 can be a projecting portion.

On an inner peripheral surface of the lens-barrel hole 13a of the module casing 10, at or near a position opposed to the fitting portion 33a, bearing portions 13c in contact with the outer peripheral surface of the cylindrical member 33 are disposed at positions symmetrical with respect to this position in terms of a circumferential direction of the lens-barrel hole 13a.

In this embodiment, as illustrated in FIG. 7, the pair of bearing portions 13c form a V-shaped slope which is thick so as to make an inside diameter of the inner peripheral surface of the lens-barrel hole 13a smaller than that at the other portion of the inner peripheral surface. Accordingly, when the collimator lens unit 30 is pressed in the arrow F direction in FIG. 7 by the adjust pin 5, the bearing portions 13c come into point contact with the outer peripheral surface of the cylindrical member 33 at P points illustrated in FIG. 8A in the circumferential direction and into line contact therewith in an axial direction. In this state, the optical axis X of the collimator lens and a light emission center of the light-emitting unit 20 coincide with each other, and the collimator lens is easily movable along the optical axis X as it is.

These bearing portions 13c are not limited to the V-shaped slope, but the bearing portion may be a slightly inwardly projecting curved surface formed at part of the inner peripheral surface of the lens-barrel hole 13a, or a curved-surface projection provided along the axial direction on the inner peripheral surface.

Further, in the bearing portions 13c or in the vicinity thereof, in this embodiment, in a middle region, of the V-shaped slope being the pair of bearing portions 13c, which is not in contact with the outer peripheral surface of the cylindrical member 33, an open-hole 13d through which an adhesive for fixing the cylindrical member 33 is finable is formed.

The collimation adjustment (focus adjustment) in the light beam generating part of the module 1 for the optical information reader thus structured is performed as follows.

The module 1 for the optical information reader whose assembly is finished is fixed to a not-illustrated jig. Then, as illustrated in FIG. 6, the tip portion of the adjust pin 5 disposed on the jig is inserted to the long hole 13b formed in the light beam generating part housing part 13 of the module casing 10, and further is fit in the fitting portion 33a formed in the outer periphery of the cylindrical member 33 of the collimator lens unit 30. By the adjust pin 5 being pressed in the arrow F direction illustrated in FIG. 7, the cylindrical member 33 of the collimator lens unit 30 is pressed in the same direction, and its outer peripheral surface is brought into point contact with the pair of bearing portions 13c formed on the inner peripheral surface of the lens-barrel hole 13a, at the P points illustrated in FIG. 8A.

When the adjust pin 5 is moved in this state in the arrow C direction or D direction illustrated M FIG. 6 by a linear feeding mechanism of the jig, the collimator lens unit 30 moves in accordance therewith along the optical axis X of the collimator lens 31, so that its distance from the light-emitting unit 20 fixed in the lens-barrel hole 13a of the module casing 10 changes.

Consequently, the laser light emitted from the laser diode 21 being the light source of the light-emitting unit 20 is turned into an accurate parallel luminous flux by the collimator lens 31 of the collimator lens unit 30, which makes it possible to perform the collimation adjustment or the focus adjustment so that the light exits as a prescribed laser beam through the aperture 32a.

This adjustment can be performed by moving the collimator lens unit 30 in both a direction in which it separates from the light-emitting unit 20 and a direction in which it approaches the light-emitting unit 20, and therefore in a case where the adjustment is made excessively in one of the directions, it is possible to return it for re-adjustment, so that a defective product due to the poor collimation adjustment scarcely occurs. The adjust pin 5 can be moved by a linear motor mechanism, a fine-pitch ball screw mechanism, or the like, and delicate adjustment can be easily made.

After the collimation adjustment is thus finished, as illustrated in FIG. 8A, while the collimator lens unit 30 is pressed in the arrow F direction by the adjust pin 5 to be pressed against the pair of bearing portions 13c, the adhesive 7 is filled in the open-hole 13d formed in the middle portion of the pair of bearing portions 13c in the module casing 10 and is cured.

If, for example, an ultraviolet curing adhesive is used as this adhesive 7, it can be cured in a short time by being irradiated with ultraviolet light after being filled.

Owing to the curing of the adhesive 7, the collimator lens unit 30 is bonded and fixed to the module casing 10 while being kept at such a predetermined position that part of its outer peripheral surface abuts on the pair of bearing portions 13c, and even if the pressing of the collimator lens unit 30 is released as illustrated in FIG. 8B by pulling out the adjust pin 5, the optical axis of the collimator lens 31 does not deviate or tilt.

Thereafter, when the adhesive is injected also from the long hole 13b for adjust pin insertion and is cured, it is possible to more surely fix the collimator lens unit 30 to the module casing 10.

On the other hand, in a reference example, as illustrated in FIG. 11A, it is assumed that an inner peripheral surface of a lens-barrel hole 10a of a module easing 10' is formed as a round cylindrical surface without having bearing portions, and the adhesive 7 is filled and cured in a gap (clearance) between the inner peripheral surface and the outer peripheral surface of the collimator lens unit 30.

In this case, as illustrated in FIG. 11B, the collimator lens unit 30 is likely to be bonded and fixed to the lens-barrel hole 10a of the module casing 10' in a state where the axis of the collimator lens unit 30, that is, the optical axis of the built-in collimator lens is deviated from or tilted relatively to a central axis of the lens-barrel hole 10a.

This is because, due to the adhesive 7 filled in the clearance between the outer peripheral surface of the collimator lens unit 30 and the inner peripheral surface of the lens-barrel hole 10a, the collimator lens unit 30 is in a floating state in the lens-barrel hole 10a, and when the adhesive 7 is cured, contraction stresses are generated as illustrated by many arrows in FIG. 11A, and due to unevenness or the like of an application amount of the adhesive, its strength differs depending on each circumferential-direction position.

Incidentally, in this embodiment, the collimator lens 31 and the aperture limit stop formation member 32 are integrally fixed to the cylindrical member 33 to form the collimator lens unit 30, but instead, an aperture limit stop formation part and a cylindrical part may be integrally provided on the collimator lens itself to form the collimator lens unit. Further, the collimator lens and the cylindrical part may be integrally formed of the same material or different kinds of materials, and the aperture limit stop formation part may be integrally fixed to the resultant to form the collimator lens unit.

Incidentally, in the module 1 for the optical information reader of this embodiment, since the module casing 10 is formed of resin, the support shaft 44 of the vibration mirror 41 is liable to lack support strength if being supported in a cantilever manner. Here, a structure for enhancing the support strength will be described based on FIG. 3 and FIG. 9. FIG. 9 is a sectional view taken along IX-IX line in FIG. 3, and the vibration mirror driver 40 is entirely hatched in the same manner.

As illustrated in FIG. 9, on the bottom surface portion 11 of the module casing 10 (including the vibration mirror driver attachment part 16), the boss 11a is formed and a lower end portion of the support shaft 44 of the vibration mirror 41 is fit therein to be supported. An upper end portion of this support shaft 44 loosely penetrates through a through hole 70a formed in the circuit board 70 to protrude upward, and a holder disk 48 having a center hole is fit therearound as illustrated in FIG. 3 and FIG. 9 and this holder disk 48 is bonded or soldered to the upper surface of the circuit board 70 to be fixed.

With this structure, the support shaft 44 of the vibration mirror 41 is supported at two points by the bottom surface portion 11 of the module casing 10 and the circuit board 70, which eliminates a risk of its tilting. Further, even when the support shaft 44 receives an external force such as a drop impact, a load for the bottom surface portion 11 of the module casing 10 to support the support shaft 44 is reduced.

Instead of the holder disk 48 having the center hole, a holder member in a hat shape having a recessed portion where to fit the upper end portion of the support shaft 44 and a flange portion may be used.

Next, FIG. 10 is a perspective view illustrating an embodiment in which a metallic foil is affixed on an outer wall surface of the module casing 10 to enhance a shielding effect, with the circuit board 70 removed.

In this embodiment using the photodiode (PD) as the light-receiving sensor 60, in order to more ensure a noise countermeasure, a metallic foil 9 is affixed on the outer wall surface, of the above-mentioned resin module casing 10, at least near a portion housing the light-receiving sensor 60 having the built-in photodiode as illustrated in FIG. 10, to thereby enhance the shielding effect.

Optical information read by the optical information reader including the module for the optical information reader according to the invention is not limited to bar codes but may be various kinds of two-dimensional codes such as PDF417, a QR code, and Aztec Code.

Hitherto, the embodiments of the invention have been described, but the invention is not limited to these, and it goes without saying that, in carrying out the invention, addition and changes can be appropriately made to their structures, part of the structures may be omitted, or shapes and materials may be changed.

The structures of the above-described embodiments and modification examples can of course be carried out by being arbitrarily combined as long as they are not mutually inconsistent.

INDUSTRIAL APPLICABILITY

The module for the optical information reader according to the invention is applicable to various kinds of optical information readers such as a bar code reader.

What is claimed is:

1. A module for an optical information reader in which a light-emitting unit having a light source, a collimator lens, a vibration mirror for scanning, a collector mirror or a condenser lens, and a light-receiving sensor are disposed in a module casing to be modularized,
wherein a collimator lens unit, in which an aperture limit stop formation member and the collimator lens are integrally disposed in a cylindrical member, is inserted in a lens-barrel hole of the module casing so as to be reciprocatable in an optical axis direction within a predetermined range, and the light-emitting unit is fixed to the module casing in the lens-barrel hole, with an optical axis of the light source aligned with an optical axis of the collimator lens, and wherein the aperture limit stop formation member radiates an output laser beam,
wherein a long hole through which an adjust pin is penetrated so as to be reciprocatable in the optical axis direction within a predetermined range is formed in a peripheral sidewall of the lens-barrel hole of the module casing, and a fitting portion in which a tip portion of the adjust pin penetrating through the long hole is fit is formed in an outer peripheral surface of the cylindrical member,
wherein, on an inner peripheral surface of the lens-barrel hole of the module casing, at a position diametrically opposite from the long hole and the fitting portion, a pair of bearing portions which, in a circumferential direction, are in point contact with the outer peripheral surface of the cylindrical member, and in an axial direction, are in line contact with the outer peripheral surface are formed at positions symmetrical with respect to the position in terms of an inner circumferential direction of the lens-barrel hole,
wherein an open-hole through which an adhesive for fixing the cylindrical member is fillable is formed in a middle region of the pair of bearing portions, and
wherein the bearing portions form a V-shaped slope by two flat surfaces which, in a circumferential direction, are in point contact with the outer peripheral surface of the cylindrical member, and in an axial direction, are in line contact with the outer peripheral surface.

2. The module for the optical information reader according to claim 1, wherein an open-hole through which an adhesive for fixing the cylindrical member is fillable is formed in a middle region, of the V-shaped slope, which is not in contact with the outer peripheral surface of the cylindrical member.

3. The module for the optical information reader according to claim 1, wherein the collimator lens unit is structured such that the collimator lens and the aperture limit stop formation member are fixed to the cylindrical member.

4. The module for the optical information reader according to claim 1, wherein the collimator lens unit is structured such that the aperture limit stop formation member and the cylindrical member are integrally disposed on the collimator lens itself.

5. The module for the optical information reader according to claim 1, wherein the collimator lens unit is structured such that the collimator lens and the cylindrical member are integrally formed of the same material or different kinds of materials, and to the resultant formed body, the aperture limit stop formation member is fixed.

6. The module for the optical information reader according to claim 1, wherein the module casing is formed of resin.

7. The module for the optical information reader according to claim 6, wherein the resin is reinforced resin in which carbon is dispersed.

8. The module for the optical information reader according to claim 6, wherein a metallic foil is affixed on an outer wall surface of the module casing made of the resin, at least near a portion where the light-receiving sensor is housed.

\* \* \* \* \*